United States Patent
Frederiksen et al.

(10) Patent No.: US 12,550,081 B2
(45) Date of Patent: Feb. 10, 2026

(54) ADJUSTED UE TX POWER RAMPING FOR INITIAL ACCESS FOR SUPPORT OF NR OVER NTN

(71) Applicant: Nokia Technologies Oy, Espoo (FI)

(72) Inventors: Frank Frederiksen, Klarup (DK);
Jeroen Wigard, Klarup (DK);
Konstantinos Manolakis, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 369 days.

(21) Appl. No.: 18/277,624

(22) PCT Filed: Jan. 20, 2022

(86) PCT No.: PCT/EP2022/051201
§ 371 (c)(1),
(2) Date: Aug. 17, 2023

(87) PCT Pub. No.: WO2022/175012
PCT Pub. Date: Aug. 25, 2022

(65) Prior Publication Data
US 2024/0137878 A1  Apr. 25, 2024
US 2024/0236879 A9  Jul. 11, 2024

Related U.S. Application Data

(60) Provisional application No. 63/150,341, filed on Feb. 17, 2021.

(51) Int. Cl.
*H04W 52/50* (2009.01)
*H04W 56/00* (2009.01)
*H04W 74/0833* (2024.01)

(52) U.S. Cl.
CPC ....... *H04W 52/50* (2013.01); *H04W 56/0045* (2013.01); *H04W 74/0833* (2013.01)

(58) Field of Classification Search
CPC ............ H04W 52/50; H04W 56/0045; H04W 74/0833; H04L 1/1887
(Continued)

(56) References Cited

U.S. PATENT DOCUMENTS 11,864,031 B2 *  1/2024  Tsai ................ H04W 72/23
12,133,269 B2 * 10/2024  Hoang ............. H04L 5/0012
(Continued)

FOREIGN PATENT DOCUMENTS

| CN | 110831236 A | 2/2020 |
|---|---|---|
| WO | WO 2020/146506 A2 | 7/2020 |
| WO | WO 2020/200134 A1 | 10/2020 |

OTHER PUBLICATIONS

J. Misic and V. B. Misic, "Efficiency of power ramping during random access in LTE," IEEE Trans. Veh. Technol., vol. 67, No. 2, pp. 1698-1712, Feb. 2018. (Year: 2018).*

(Continued)

*Primary Examiner* — Christopher M Crutchfield
*Assistant Examiner* — Syed Ahmed
(74) *Attorney, Agent, or Firm* — Carter, DeLuca & Farrell LLP

(57) ABSTRACT

In a non-terrestrial network, the delay in reception time may prevent reception of a random access preamble. A combination of increasing transmit power and changing the timing with which the random access preamble is transmitted may enable reception of the random access preamble. One or more criteria may be used to determine whether the timing advance value with which the random access preamble is transmitted should be changed before retransmission is attempted.

19 Claims, 11 Drawing Sheets

(58) Field of Classification Search
USPC .......................................................... 370/329
See application file for complete search history.

(56) References Cited

U.S. PATENT DOCUMENTS

| | | |
|---|---|---|
| 2023/0090914 A1* | 3/2023 | Cha .................. H04W 24/10 370/329 |
| 2023/0099762 A1* | 3/2023 | Khoshkholgh Dashtaki .............. H04W 56/001 370/350 |
| 2024/0032103 A1* | 1/2024 | Rastegardoost .. H04W 74/0833 |
| 2025/0008572 A1* | 1/2025 | Hoang ................. H04W 72/02 |

OTHER PUBLICATIONS

Zhen, Li, et al. "Energy-efficient random access for LEO satellite-assisted 6G internet of remote things." IEEE Internet of Things Journal 8.7 (2020): 5114-5128. (Year: 2021).*

Kodheli, Oltjon, et al. "Random access procedure over non-terrestrial networks: From theory to practice." IEEE Access 9 (2021): 109130-109143. (Year: 2021).*

* cited by examiner

| GEO at 35786 km | | | |
|---|---|---|---|
| Elevation angle | Path | D (km) | Time (ms) |
| UE :10° | satellite - UE | 40586 | 135.286 |
| GW : 5° | satellite - gateway | 41126.6 | 137.088 |
| 90° | satellite - UE | 35786 | 119.286 |
| Bent Pipe satellite | | | |
| One way delay | Gateway-satellite_UE | 81712.6 | 272.375 |
| Round trip Time | Twice | 163425.3 | 544.751 |
| Regenerative Satellite | | | |
| One way delay | Satellite -UE | 40586 | 135.286 |
| Round Trip Time | Satellite-UE-Satellite | 81172 | 270.572 |

FIG. 3

ADJUSTED UE TX POWER RAMPING FOR INITIAL ACCESS FOR SUPPORT OF NR OVER NTN

CROSS REFERENCE TO RELATED APPLICATION

This patent application is a U.S. National Stage application of International Patent Application Number PCT/EP2022/051201 filed Jan. 20, 2022, which claims priority to U.S. provisional Application No. 63/150,341 filed Feb. 17, 2021, which are hereby incorporated by reference in their entireties.

BACKGROUND

Technical Field

The example and non-limiting embodiments relate generally to communications and, more particularly, to the transmission of a random access preamble by a user equipment to a base station via a non-terrestrial network.

BRIEF DESCRIPTION OF PRIOR DEVELOPMENTS

It is known, for random access procedure, to increase transmit power of a user equipment where a response to a random access preamble is not received within a given time window.

BRIEF DESCRIPTION OF THE DRAWINGS

The foregoing aspects and other features are explained in the following description, taken in connection with the accompanying drawings, wherein:

FIG. 3 is a table illustrating features as described herein.

DETAILED DESCRIPTION OF EMBODIMENTS

Figure 1:
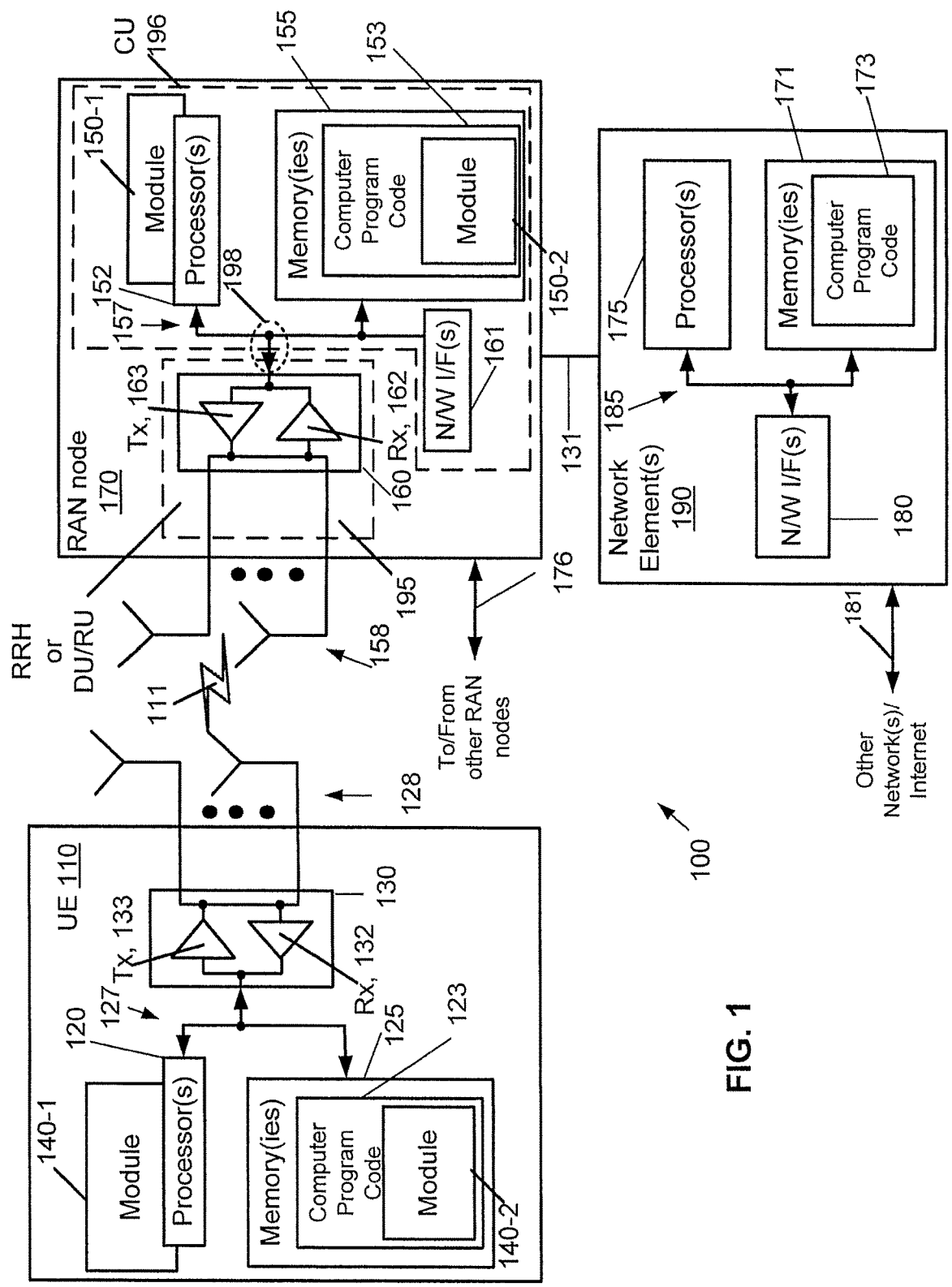
FIG. 1 is a block diagram of one possible and non-limiting exemplary system in which the exemplary embodiments may be practiced.

The following abbreviations that may be found in the specification and/or the drawing figures are defined as follows:
3GPP third generation partnership project
5G fifth generation
5GC 5G core network
AMF access and mobility management function
CU central unit
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
GEO geo-stationary
gNB (or gNodeB) base station for 5G/NR, i.e., a node providing NR user plane and control plane protocol terminations towards the UE, and connected via the NG interface to the 5GC
GNSS global navigation satellite system
HAPS high altitude platform system
I/F interface
L1 layer 1
LEO low-earth orbit
LTE long term evolution
MAC medium access control
MEO medium earth orbit
MME mobility management entity
ng or NG new generation
ng-eNB or NG-eNB new generation eNB
NR new radio
NTN non-terrestrial network
N/W or NW network
PDCP packet data convergence protocol
PHY physical layer
RA random access
RACH random access channel
RAN radio access network
RF radio frequency
RLC radio link control
RO RACH occasion
RRH remote radio head
RRC radio resource control
RS reference signal
RTT round trip time
RU radio unit
Rx receiver
SDAP service data adaptation protocol
SEP storage encapsulation protocol
SGW serving gateway
SIB system information block
SIP session initiation protocol
SMF session management function
SS synchronization signal
SSB synchronization signal blocks
TA timing advance
Tx transmitter
UE user equipment (e.g., a wireless, typically mobile device)
UPF user plane function
UTC universal time clock Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s)

190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

The RAN node 170 may be part of a non-terrestrial network (NTN). While not pictured in FIG. 1, it is possible that the wireless link 111 between the UE 110 and the RAN node 170 involves non-terrestrial deployment, such as one or more satellites. The one or more satellites may include a geo-stationary (GEO) satellite, a low-earth orbit (LEO) satellite, and/or a medium earth orbit (MEO) satellite. The satellite(s) may implement transparent architecture, in which the satellite may act as a simple amplify-and-forward node, thereby allowing the gNB to be located on earth. Alternatively, the satellite(s) may implement regenerative architecture, in which gNB functionalities are embedded/implemented on the satellite, thereby reducing the round-trip time for L1 operations. The satellite(s) may comprise one or more of the modules described above with reference to RAN node 170 or RAN node 190. Additionally or alternatively, the satellite(s) may include additional or different modules.

Features as described herein generally relate to New Radio (NR) over non-terrestrial networks (NTN). More particularly, features as described herein generally relate to the random access procedure. The 3GPP is currently conducting a Rel-17 Work Item (RP-193234) to facilitate NR over NTN. In Rel-16, a Study Item on the same topic was carried out; the observations are provided in TR 38.821.

As part of the random access procedure, the UE may transmit a random access preamble with a large cyclic prefix. This large cyclic prefix may allow for having a difference in time of arrival of signals from UEs at a base station. The gNB may use this large cyclic prefix to distinguish signals from different UEs, which may have experienced different propagation delays. Current preamble design for 5G NR may allow for/permit a propagation delay that corresponds to more than 100 km of distance between the gNB and the UE. However, in NTN, there may be a propagation delay that corresponds to even greater distances.

In an example embodiment, there may be support for geo-stationary (GEO) satellites and low-earth orbit (LEO) satellites, where the LEO satellites may support both earth fixed beams (i.e. beams from the satellites are kept oriented towards a fixed area on earth's surface) and earth moving beams (where the satellite beams have a constant orientation, and so sweep the earth's surface along with the satellite's orbit).

It may be noted that current work item for NTN are focused on LEO and GEO scenarios, but support for medium-earth orbit (MEO) and high altitude platform systems (HAPS) may be implicitly provided for according to example embodiments of the present disclosure.

In an example embodiment, the satellite may implement transparent architecture, meaning that it will act as a simple amplify-and-forward node, thereby allowing the gNB to be located on earth. Accordingly, the round trip time may be of interest in ensuring that a random access preamble is received during the time window of the gNB.

Figure 2:
FIG. 2 is a diagram illustrating features as described herein.

Referring now to FIG. 2, illustrated are examples of potential satellite (i.e. non-terrestrial) deployments. The one-way propagation delay between a UE on earth and a LEO satellite may be, for example 6.4 ms in the example of 220, a LEO satellite 600 km away, and 12.1 ms in the example of 230, a LEO satellite 1500 km away. The one-way propagation delay between a UE on earth and a MEO satellite may be, for example, 46.7 ms, as at 240, for a MEO satellite between 8,000 and 20,000 km away. The one-way propagation delay for a GEO satellite may be, for example, 135.3 ms, as at 250, for a GEO satellite 35786 km away. It may be noted that these propagation delays may not be accounted for by a cyclic prefix configured to allow for a propagation delay that corresponds to approximately 100 km of distance between the gNB and the UE.

In NTN, the round-trip time (RTT) may be very long due to the large distance between a satellite and the UE. An example RTT for geo-stationary deployment using bent-pipe or regenerative satellite is shown in FIG. 3. Referring now to FIG. 3, illustrated is a table of example round-trip time(s) for a geo-stationary satellite located approximately 35786 km away, such as 250 of FIG. 2. For a bent pipe satellite 310, the one way delay for a message to travel from a gateway to a satellite to a UE may be 272.375 ms. For a bent pipe satellite 310, the round trip time may be 544.751 ms. For a regenerative satellite 320, the one way delay for a message to travel from a satellite to a UE may be 135.286 ms. For a regenerative satellite 320, the round trip time may be 270.572 ms.

In an example embodiment, a UE may have access to Global Navigation Satellite System (GNSS) location and/or time information (i.e. GNSS support, or access to GPS location and/or GPS time) so that it may determine the correct time to transmit its random access preamble in order to ensure that the preamble will be received by the network within the configured cyclic prefix. In other words, the UE may be able to obtain an understanding of the timer/frequency relations between itself and a satellite.

In a communication system, the mobile device may perform synchronization with a base station (with the base station being a central element at which scheduling decisions for multiple devices are performed). Since there may be a propagation delay between the base station and the UE, the UE might not be aware of the absolute transmit timing at the base station (e.g. gNB). The UE may perform synchronization based on its observation of synchronization signals from the gNB (e.g. synchronization signal blocks (SSB), which may be further transmitted in bursts (SSB burst), which may cover multiple transmit beams). After having obtained synchronization with the gNB, the UE may attempt to access the cell using the random access procedure. The random access procedure consists of a UE transmitting a preamble, which may allow for a difference in time of arrival of the signals at the gNB, for example by implementing a large cyclic prefix as part of the signal. This large cyclic prefix may be needed for the gNB to be able to receive and distinguish signals from different UEs that may have experienced different propagation delays. Current preamble design for 5G NR allows for a propagation delay that corresponds to more than 100 km of distance between the gNB and the UE. However, in NTN, the random access preamble of a UE using a large cyclic prefix as currently supported might not arrive at the gNB within the expected time window because the propagation delay is too great. Example embodiments of the present disclosure may account for propagation delays that may occur in NTN.

In an example embodiment, a timing adjustment by the UE may take into account the higher signal propagation delay in NTN. The transmission timing adjustment may be autonomous, or may be configured or controlled by a gNB.

In an example embodiment, a UE may detect/determine that the accuracy of the GNSS time and/or location information is below a threshold(s), and may, in response, determine and apply different timing advance (TA) values after having tried (and failed) RACH access with the initial timing.

In an example embodiment, a UE may be configured to implement at least one of two possible approaches for obtaining knowledge of the correct time to transmit its random access preamble while ensuring that it is received within the configured cyclic prefix. These two possible approaches may include a GNSS location based approach and a GNSS time based approach.

Under a GNSS location-based approach, the UE may obtain its geographical location from the GNSS system, meaning that it is able to know its own x, y, z location at any given time. The UE may also be able to obtain the location of a satellite in space as x, y,z coordinates, as well as the velocity vector of the satellite (i.e. its velocity in all three directions using x, y,z coordinates). The UE may be able to obtain this satellite information from information broadcast by the satellite. Based on its own x, y,z coordinates and the x, y,z coordinates of the satellite, the UE may be able to calculate the line-of-sight distance between itself and the satellite. Based on the velocity vector of the satellite, the UE may also be able to calculate the line-of-sight distance between itself and the satellite for a period into the future. Accordingly, the time difference to the satellite may be determined. In case of a transparent architecture, the delay of the feeder link (i.e. the delay introduced by the time difference to the satellite) may be taken into account. The time difference may be provided by the network. This GNSS location-based approach may make it possible for the UE to pre-compensate the transmit timing of its random access preamble (e.g. with a timing advance) to ensure that it is received within the cyclic prefix that the gNB has configured.

Under a GNSS time-based approach, the UE may receive reference time information from the gNB (i.e. as broadcast in the system information block 9 (SIBS), which may contain referenceTimeInfo-r16, which may contain the gNB's understanding of "time" (e.g. in UTC)). By decoding the GNSS signal, a UE may be able to get/obtain/determine an understanding of time at its own location (i.e. GNSS reference time in UTC). Based on the gNB SIBs information and the GNSS reference time, the UE may be able to derive/determine an observed difference in time. Based on this observed difference, it may be possible for the UE to compensate the transmit timing to meet the requirement that random access preambles be received by the a gNB within the cyclic prefix.

It should be noted that these two GNSS-based approaches may be subject to inaccuracies. For example, GNSS information may not be accurate due to the effects of: dense urban environments; location with limited GNSS coverage (semi-indoor); deep forest (limited vision to wide sky); and/or the GNSS system being subject to disturbances (outage, spoofing, interference, etc.). As a result of these inaccuracies in the GNSS information, the calculated distance between the UE and the satellite or the observed difference between the time of the UE and the satellite may be inaccurate, resulting in a compensation of the transmit timing of the random access preamble that does not enable the random access preamble to be received within the cyclic prefix.

Figure 4:
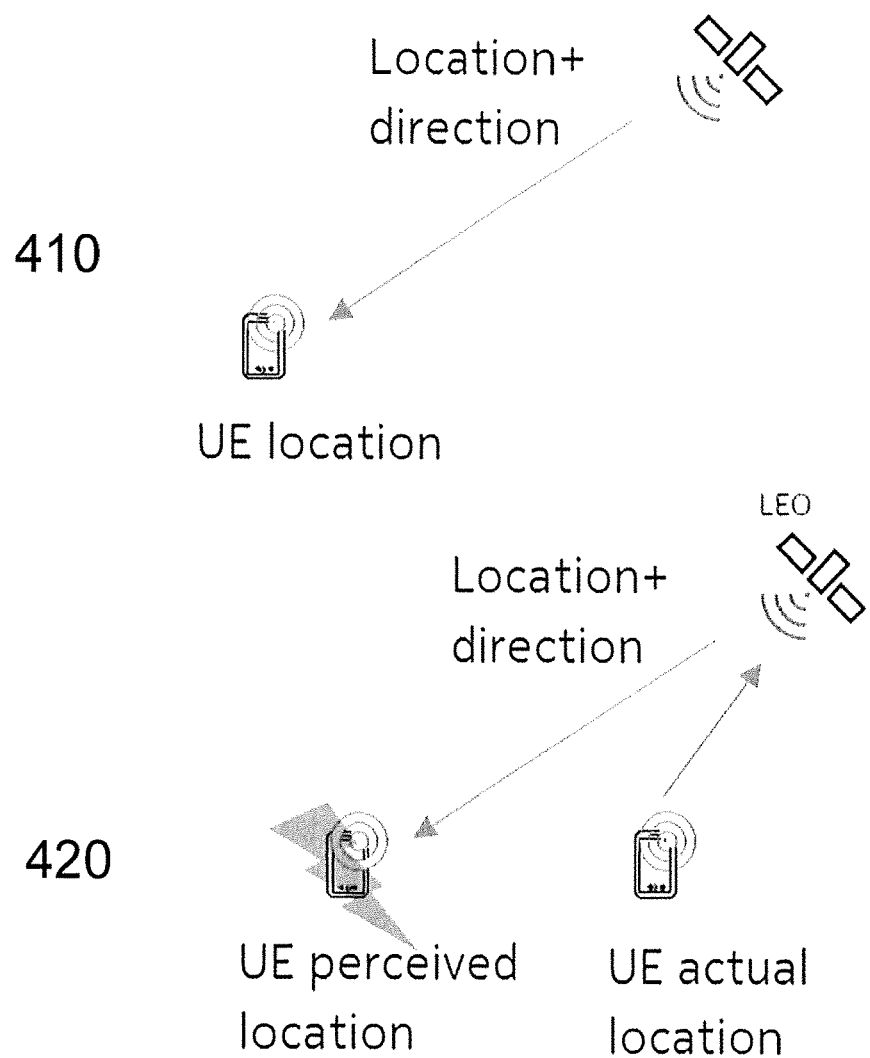
FIG. 4 is a diagram illustrating features as described herein.

Referring now to FIG. 4, illustrated is an example in which the UE's perceived location, based on the GNSS information, is inaccurate, i.e. different from the actual location of the UE. At 410, the UE receive information indicating the location of the UE and the location of a LEO satellite. According to the GNSS location-based approach described above, the UE may determine a line-of-sight distance between the UE and the satellite. However, at 420, the GNSS information indicating the location of the UE may be inaccurate, resulting in the perceived location of the UE based on the GNSS information being different from the actual location of the UE. Based on this inaccuracy in the GNSS information, the determined line-of-sight distance between the UE and the satellite may be incorrect. Features as described herein may relate to scenarios in which GNSS information may be imperfect/inaccurate/not trustworthy.

If the UE's perceived location is not aligned with the actual position, the UE's internal algorithm for compensating the transmit timing for random access preamble (and later signals) may provide the wrong timing offset. Accordingly, the signals received at the gNB may be offset to a level that may not be acceptable to maintain network performance. As a result, the UE may not receive a response to, for example, a random access preamble, from the gNB at the expected time/during an expected time window.

Figure 5:
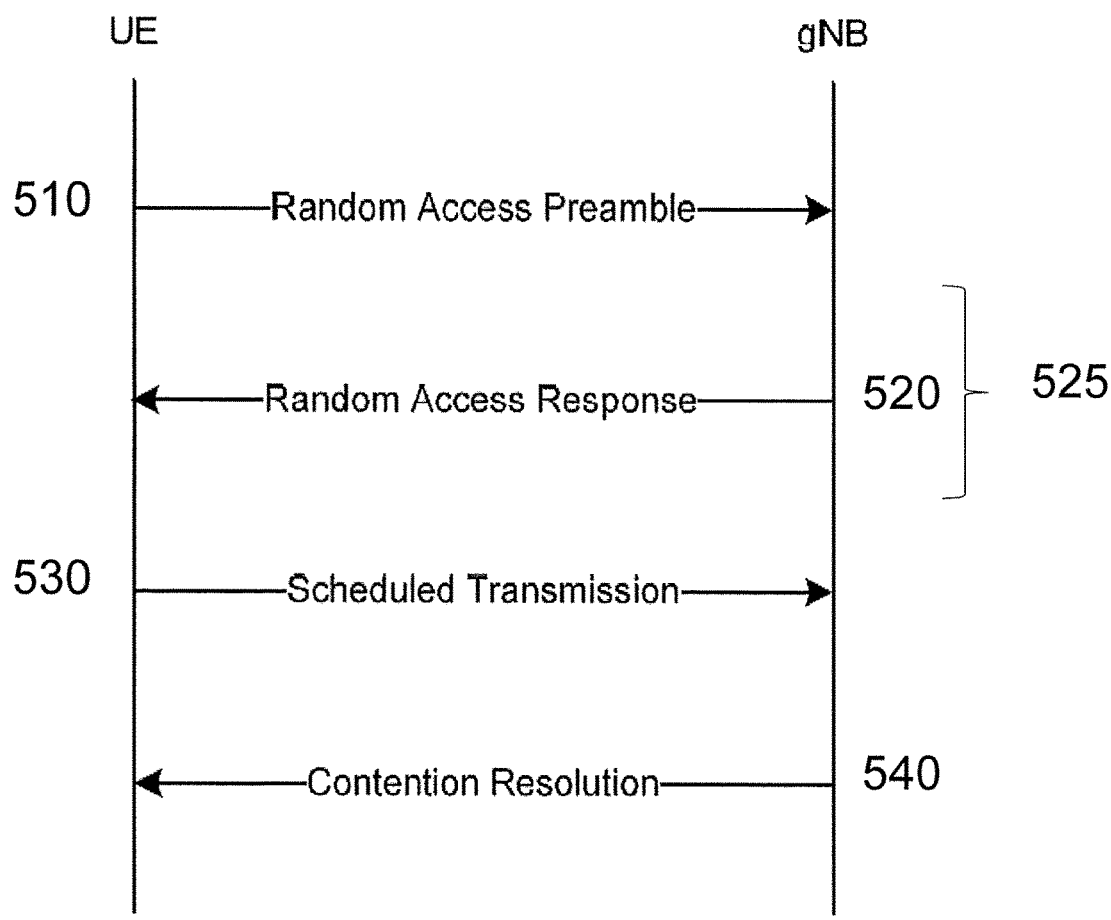
FIG. 5 is a diagram illustrating features as described herein.

In a 4-step RACH procedure, the UE may initiate transmission towards the gNB by transmitting a random access preamble using the configured time and frequency resources. Referring now to FIG. 5, illustrated is an example of the steps/message exchanges that may occur as part of a 4-step RACH procedure. Before transmitting the random access preamble, the UE may perform an assessment of the received signal power level, as measured from the DL synchronization signals (SS)/synchronization signal block (SSB) transmitted by the gNB and, based on that assessment, adjust its transmit power to a configured output level (outer loop power control). At 510, the UE may transmit the random access preamble. This transmission may be according to the adjusted transmit power. The UE may expect to receive a response (Msg2) to the random access preamble transmission within a random access response window, 525. For example, the UE may receive a random access response at 520. Based on the random access response, the UE may perform a scheduled transmission at 530. At 540, the gNB may perform contention resolution.

Figure 6:
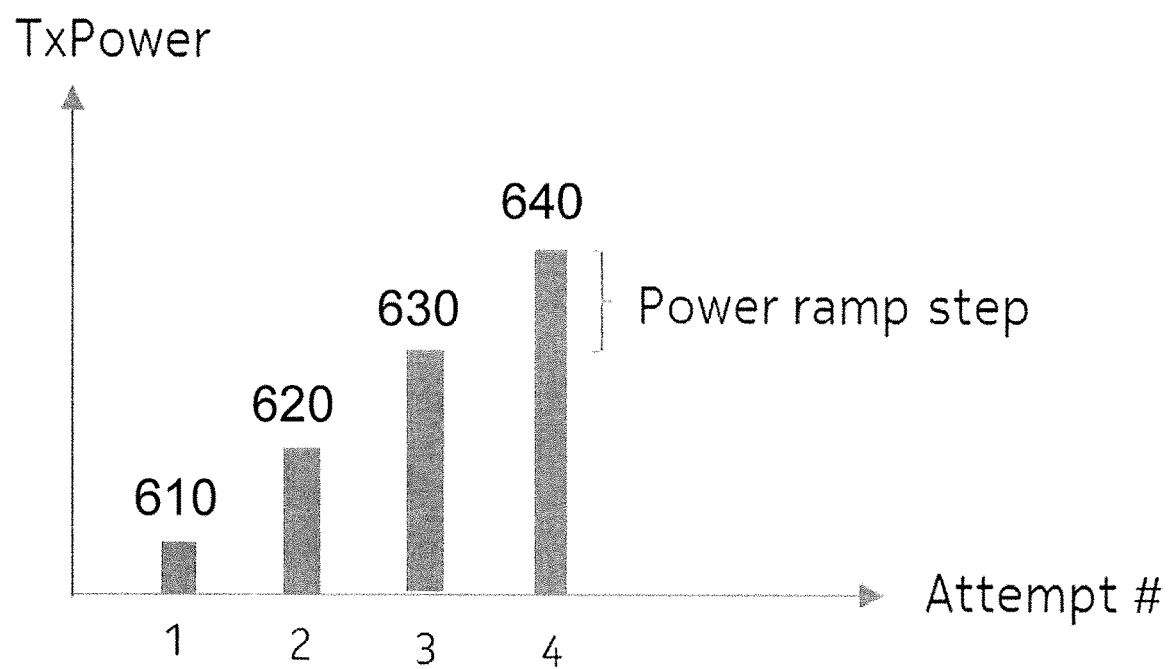
FIG. 6 is a graph illustrating features as described herein.

However, if a UE does not receive any response to the random access preamble transmission within a given time window 525, the UE may be allowed to increase the transmit power (e.g. by a configured amount) and retry the random access preamble transmission. Referring now to FIG. 6, illustrated is an example of a power ramping procedure of the UE. When UE maximum transmit power is reached, it saturates at the maximum power level. In other words, the UE's transmission power may be increased by steps, but will not be increased beyond use of a maximum power level. For a first attempt, the transmission power may be at a first level, 610. This transmission power level may be a configured power level. If a response to the random access preamble 510 is not received during the time window 525, the random access preamble may be transmitted again in a second attempt at a higher transmission power level, 620. This pattern of successive transmission attempts while increasing transmit power may be allowed to continue for a configured number of times, and/or the UE may be allowed to reach its maximum transmit power level while continuing the transmissions of the random access preamble. In the example of FIG. 6, the UE may make a third attempt at a transmission power level 630, and a fourth attempt at a transmission power level 640. The power level may increase according to a configured power ramp step(s).

The UE may continue to attempt transmission of a random access preamble until a random access response is received during a time window, until a maximum number of attempts have been made, or until a maximum transmit power level has been reached.

A UE power ramping procedure may make it possible for the received power levels of the potential different UEs random access preambles received by the gNB to be aligned to approximately the same power level at the gNB such that it is possible to detect more than one single preamble (i.e. cancelling the near-far effect). In other words, a UE that is far from the gNB may be able to use the power ramping procedure so that a message that it transmits will be received by the gNB with a same power level as a UE that is near the gNB. This principle is shown in FIG. 6.

In current random access procedures for terrestrial networks, all UE transmissions may be assumed to occur with a UE assumed timing advance (TA) value of "0," according to description in 3GPP TS 38.211. For NTN systems, the UE may use a TA value that is different than "0." The TA value may either be defined/configured by the gNB, or the UE may perform autonomous determination of a time offset/TA value to apply. Features as described herein may relate to situations in which the TA may be incorrect or inaccurate, whether determined/estimated by the UE or configured by the network.

If the UE location and/or the satellite location is uncertain (e.g. due to GNSS information inaccuracies, corrupted/inaccurately broadcast satellite information, etc.), there may be a risk that the UE has chosen/been configured with the wrong TA value for preamble transmission. This may lead to the UE not receiving any answer from the network (e.g. message 520 in FIG. 5). According to a power ramping procedure, the UE may then increase its transmit power, as explained above, but might not adjust the timing (i.e. change the TA applied). By increasing transmit power but not adjusting TA, a UE may cause increased interference to other users while not increasing the probability of successful access. In other words, even if the UE transmits a random access preamble with greater power, the random access preamble may not be received/detected by a base station during the cyclic prefix. Features as described herein may relate to UE operation prior to the reception of the Msg2 of the random access procedure (e.g. 520 of FIG. 5).

Features as described herein may relate to NTN networks, where propagation delays may be large and may also depend on the UE's location within the cell. Example embodiments of the present disclosure may enable a UE to address the possibility of large propagation delays (as compared with terrestrial network) and inaccurate location/timing information. Example embodiments of the present disclosure may provide a procedure for selecting a timing advance which may be based, at least partially, on the reliability of input information.

Figure 7:
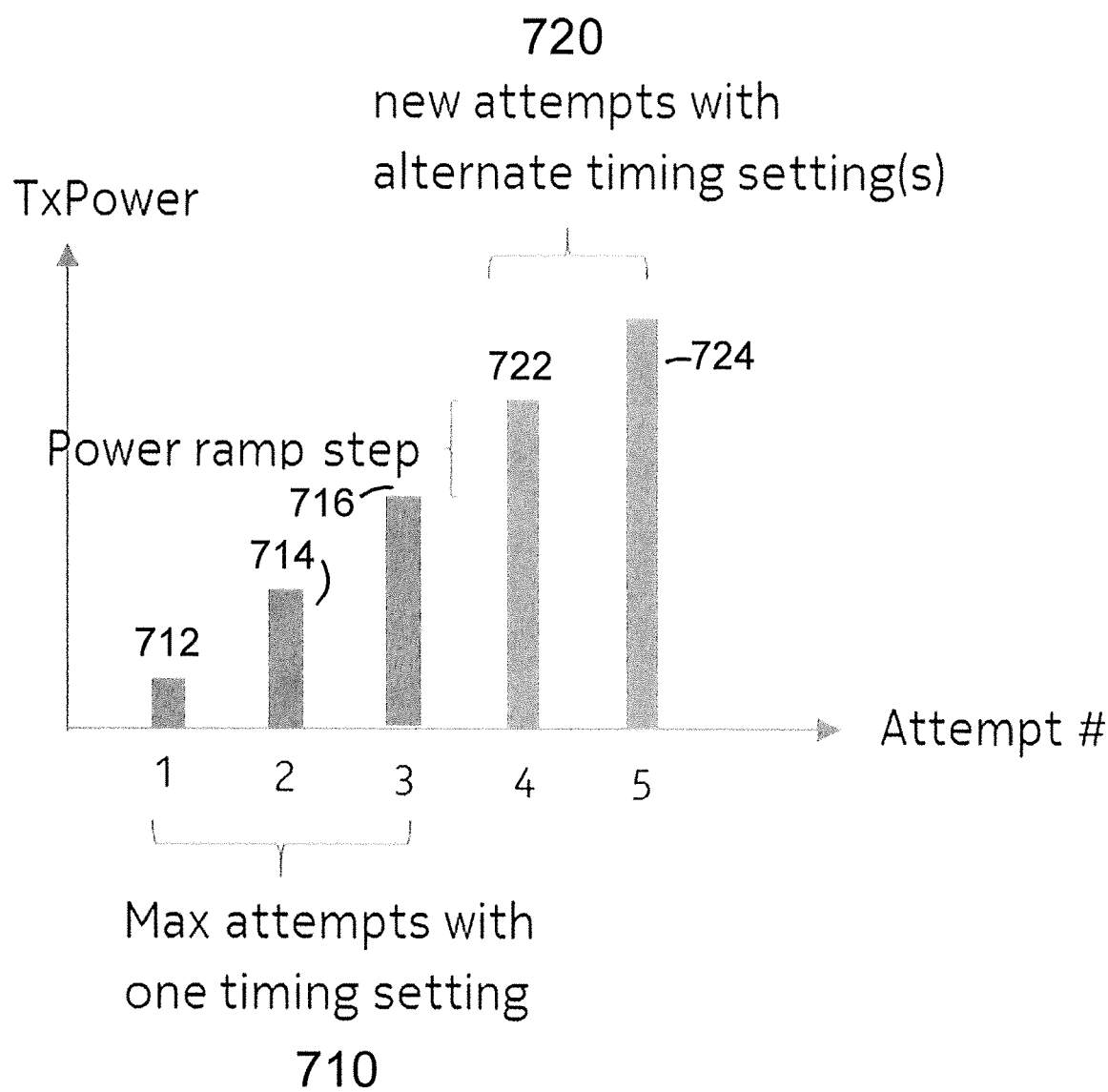
FIG. 7 is a graph illustrating features as described herein.

In an example embodiment, UE transmission timing adjustments may be included as part of the random access procedure. The UE transmission timing adjustment may be autonomous or configured/steered by the gNB (e.g. provided through configuration). The transmission timing adjustment may be performed after a number of power ramping steps, as shown in FIG. 7, or the timing adjustments may be performed before the power ramping steps, or power ramping and timing adjustment steps may be interleaved (i.e. among subsequent transmission attempts). In an example embodiment, whether and when to perform timing adjustments during the random access procedure may depend on a configuration received from the network.

Referring now to FIG. 7, illustrated is an example in which timing adjustment steps are performed after a number of power ramping steps. A UE may be configured with a maximum number of transmission attempts (710) for attempting transmission of a random access preamble with a same timing setting (i.e. with a same TA value). In the example of FIG. 7, a UE may perform three power ramping steps with a same timing setting (712, 714, 716). However, a UE may be configured to perform a different number of power ramping steps with a same timing setting. After performing the maximum number of attempts with one timing setting, 710, a UE may attempt to access the network with alternate timing setting(s), 720. In the example of FIG. 7, a UE may perform access attempts 4 (722) and 5 (724). Access attempts 722 and 724 may be performed with the same timing setting, which is different from the timing setting used for access attempts 712, 714, and 716, or may be performed with different timing settings, which are both different from the timing setting used for access attempts

712, 714, and 716. Access attempts 722 and 724 may coincide with increases in the transmission power, which may be according to a configured power ramping step.

In an example embodiment, the UE may be able to extract/determine a reliability measure that can be used to assess whether or not the UE has a reliable estimate of its needed timing advance value. Additionally or alternatively, the UE may be able to extract/determine a reliability measure that can be used to assess whether or not the UE has a reliable estimate of its geo-location for subsequent calculation of the needed timing advance value. The UE might only adjust its timing if the reliability is not good enough, i.e. lower than a certain threshold. In other words, the UE might not adjust the TA value if one or more reliability measures are above corresponding thresholds. These reliability measures may be used instead of, or together with, a maximum number of network access attempts a UE is configured to make with one timing setting before adjusting the TA value.

In an example embodiment, the UE may allow a change of transmission timing (i.e. autonomously) between access attempts without any configuration from the network. Such UE change of transmit timing might be allowed only after a certain number of transmission attempts have been made, or when the UE has reached its maximum transmit power level.

Figure 8:
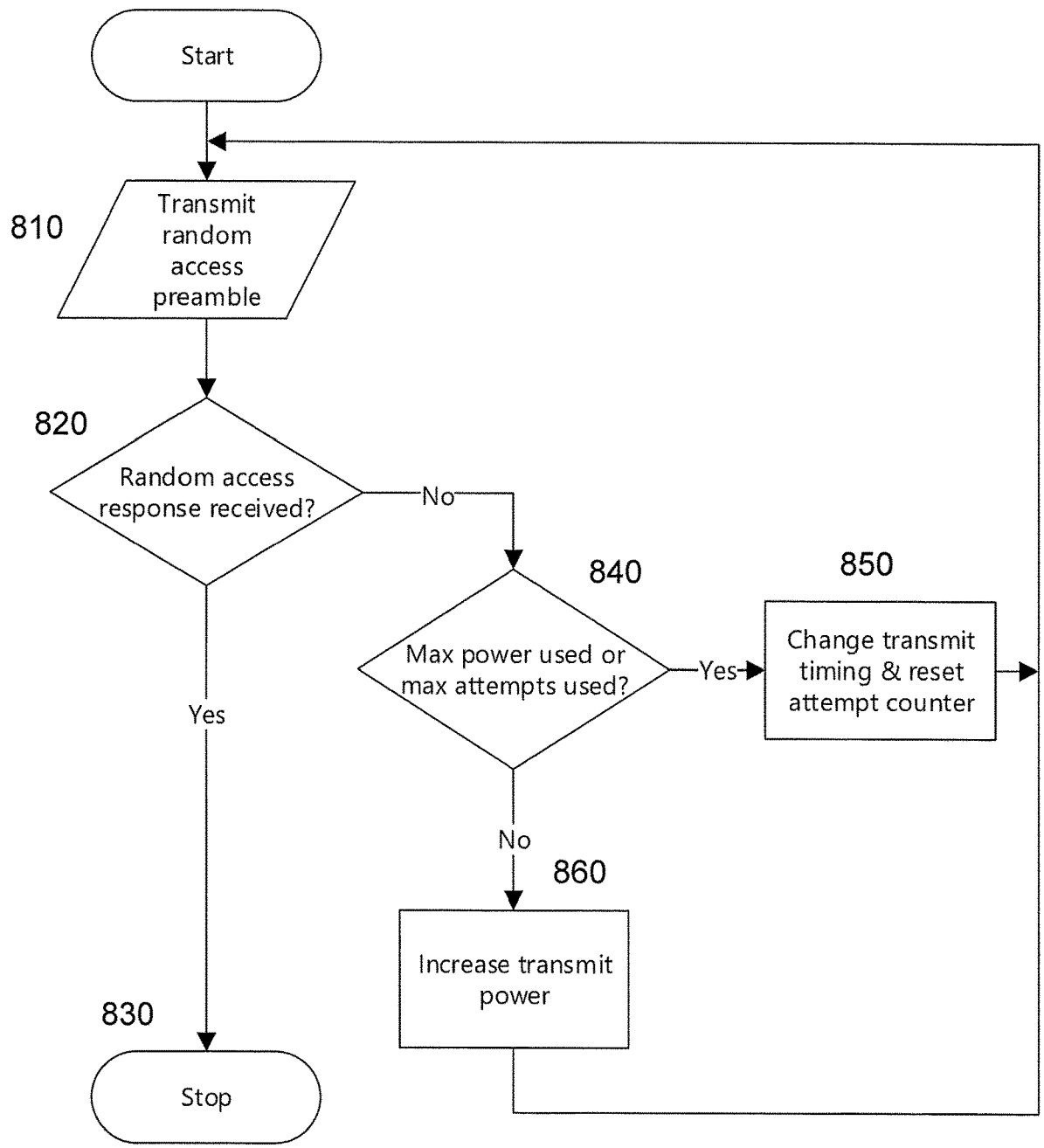
FIG. 8 is a flowchart illustrating steps as described herein.

Referring now to FIG. 8, illustrated is a flowchart illustrating the decision making process of a UE attempting random access to a network, according to one or more example embodiments of the present disclosure. At 810, a UE may transmit a random access preamble to the network. This transmission may be made using a preconfigured or predetermined transmission power level. This transmission may be made using a preconfigured or predetermined TA. After transmitting the random access preamble, the UE may monitor for a random access response during a time period, 820. If the random access response is received, then the UE may exit the decision making process, 830, and proceed with its scheduled transmission, as at 530 of FIG. 5.

If the random access response is not received, the UE may decide whether and how to transmit the random access preamble in another attempt. This determination may be made according to a specification of the UE or may be configured by the network. This determination may depend on one or more of: the number of attempts that have been made; the reliability of the timing estimate; the reliability of the location estimate; or the maximum transmit power level of the UE. In the example of FIG. 8, the UE may determine whether a maximum transmission power has been used and/or whether a maximum number of attempts to transmit the random access preamble and receive the random access response have been made, 840.

In one example, the UE may determine only whether a maximum transmission power has been used. If a maximum transmission power has not been used, the UE may determine to increase transmit power 860, and then transmit the random access preamble again, 810. If the maximum transmission power has been used, the UE may determine to change the transmit timing and reset the attempt counter, 850. The UE may then transmit the random access preamble with the updated transmit timing, 810.

Alternatively, there may be a counter for a total number of attempts, in which case the attempt counter may be incremented rather than reset at 850. In the case of a counter for a total number of attempts, at if the total number of attempts has been reached, the UE may exit from the random access procedure (i.e. stop making attempts to transmit the random access preamble to the network base station) at 840.

In another example, the UE may determine only whether a maximum number of attempts to transmit the random access preamble have been made. If the maximum number of attempts have not been made, the UE may increase the transmit power, 860, and then transmit the random access preamble again, 810. If the maximum number of attempts have been made, the UE may change the transmit timing and reset the attempt counter, 850. Optionally, the UE may also determine to increase the transmit power. The UE may then transmit the random access preamble with the updated transmit timing (and, optionally, the increased transmit power), 810.

In a third example, the UE may determine whether the maximum transmission power has been used and the maximum number of attempts to transmit the random access preamble have been made. If the maximum transmission power has not been used, or the maximum number of attempts to transmit the random access preamble have not been made, the UE may increase the transmit power, 860, and then transmit the random access preamble again, 810. If the maximum transmission power has been used and the maximum number of attempts to transmit the random access preamble have been made, the UE may change the transmit timing and reset the attempt counter, 850. Optionally, the UE may also determine to increase the transmit power. The UE may then transmit the random access preamble with the updated transmit timing (and, optionally, the increased transmit power), 810.

In a fourth example, increasing transmit power and changing transmit timing may be performed in interleaving access attempts. For example, the maximum number of attempts may be set to 1. When the number of attempts is 0, the UE may increase the transmit power, 860, and increment the number of attempts made to 1. The UE may then attempt to transmit the random access preamble with the increased transmit power, 810. If the random access response is not received, 820, the UE may determine that the number of attempts made is 1, and proceed to change the transmit timing and reset the attempt counter to 0, 850. The UE may then attempt to transmit the random access preamble with the adjusted transmission timing, 810. In this example, at 840 the UE may determine whether the maximum number of attempts have been used at 840. If the maximum power has been used, the UE may exit from the random access procedure (i.e. stop making attempts to transmit the random access preamble to the network base station).

While not illustrated in FIG. 8, at 840 the UE may also determine the reliability of the timing estimate and/or the reliability of the location estimate. In other words, the determination of whether to adjust the transmit timing may take into account the accuracy of the timing estimate such that the timing advance adjustments are only allowed for cases where the UE has an assumption of the timing estimate not being accurate. If the timing estimate is assumed/determined by the UE to be accurate, the UE might not make timing advance adjustments. For example, if the timing estimate is determined to be reliable (i.e. the measure of reliability is above a threshold value), the UE may choose not to change the transmit timing, 850, and instead increase transmit power, 860, if possible. If the timing estimate is determined to be unreliable (i.e. the measure of reliability is below a threshold value), the UE may choose to change the transmit timing, 850. If the location estimate is determined to be reliable (i.e. the measure of reliability is above a threshold value), the UE may choose not to change the transmit timing, 850, and instead increase transmit power, 860, if possible. If the location estimate is determined to be unreliable (i.e. the measure of reliability is below a threshold value), the UE may choose to change the transmit timing, 850.

Figure 9:
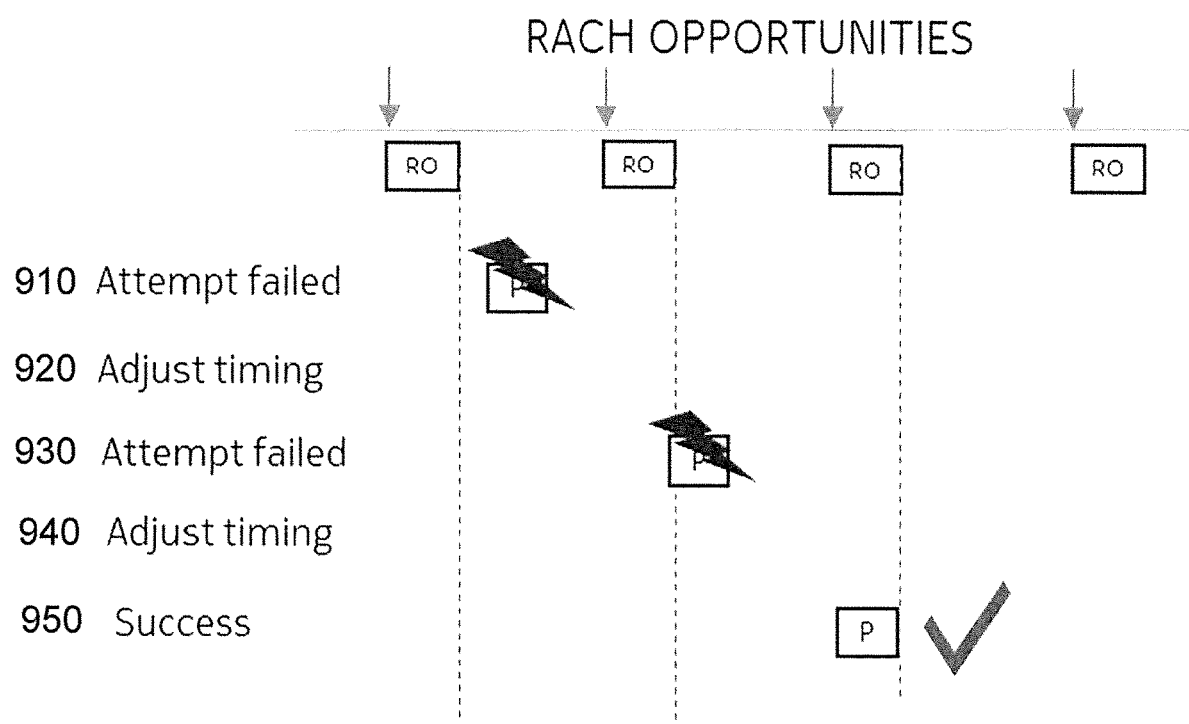
FIG. 9 is a diagram illustrating features as described herein.

Referring now to FIG. 9, illustrated is a diagram illustrating an example of when (successive) random access attempts are received by a gNB with respect to RACH occasions (RO). The time-wise series of events illustrated at FIG. 9 may correspond, for example, to access attempts 716, 722, and 724 of FIG. 7, where it may be seen that the UE is adjusting its transmit timing for each RACH occasion, which may have the effect of increasing the probability of having the random access preamble being received with the correct timing at the gNB side. At 910, a random access preamble may be received outside of an RO (i.e. not time aligned). At 920, the UE may fail to receive a random access response, and may adjust its timing. At 930, a random access preamble transmitted with different TA may be received outside of an RO. At 940, the UE may fail to receive a random access response, and may adjust its timing. At 950, a random access preamble transmitted with different TA may be received during an RO. Having received the random access preamble, the base station may transmit a random access response to the UE. In the example of FIG. 9, the timing of the random access preamble was incorrect (i.e. not received during a time window) and so the first two random access attempt were unsuccessful. The initial timing may have been incorrect due to inaccurate (e.g. GNSS-dependent) timing information at the UE. In the example of FIG. 9, increasing transmit power and using the same timing advance would not result in receipt of the random access preamble by the gNB.

While not illustrated in FIG. 8, it may be possible that the UE makes a maximum total number of access attempts, changes the transmit timing a maximum number of times, and/or increases the transmit power to a maximum power. In such a situation, it may be possible for the UE to decide not to continue attempting random access.

In an example embodiment, the UE may have the possibility to adjust the transmit timing of the random access preamble in parallel to increasing the transmit power of consecutive transmission attempts. Optionally, the UE may adjust the transmit timing every time the transmit power is increased. Optionally, the UE may adjust the transmit timing for attempts in alteration with attempts for which transmit power is increased. Optionally, the UE may adjust the transmit timing for the random access preamble, only after the maximum transmission attempts (or maximum transmit power) has been reached. If the transmit timing is only adjusted after the maximum transmit power has been reached, successive attempts may include an adjustment to the transmission timing but not to the transmission power.

According to an example embodiment of the present disclosure, any parameter (e.g. adjustment step, transmit timing, number of attempts to use prior to adjusting transmit timing, total number of attempts, etc.) may be defined autonomously by the UE, or pre-configured or configured by the network.

A technical effect of example embodiments of the present disclosure may be to increase the Random Access success rate for NTN. A technical effect of example embodiments of the present disclosure may be to enable gNB control of UE behavior with regard to RACH procedure.

Figure 10:
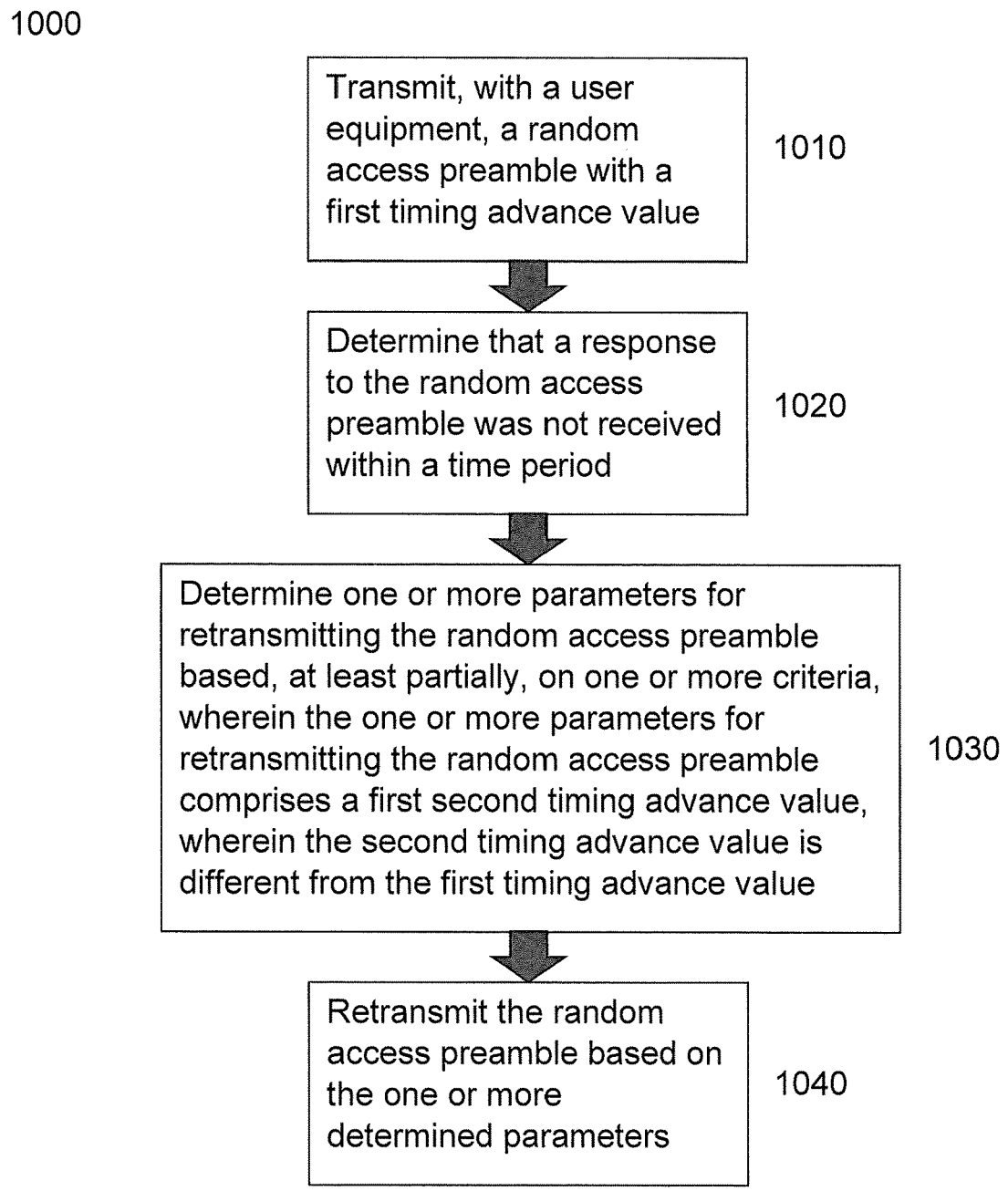
FIG. 10 is a flowchart illustrating steps as described herein.

FIG. 10 illustrates the potential steps of an example method 1000. The example method 1000 may include: transmitting, with a user equipment, a random access preamble with a first timing advance value, 1010; determining that a response to the random access preamble was not received within a time period, 1020; determining one or more parameters for retransmitting the random access preamble based, at least partially, on one or more criteria, wherein the one or more parameters for retransmitting the random access preamble comprises a first second timing advance value, wherein the second timing advance value is different from the first timing advance value, 1030; and retransmitting the random access preamble based on the one or more determined parameters, 1040.

Figure 11:
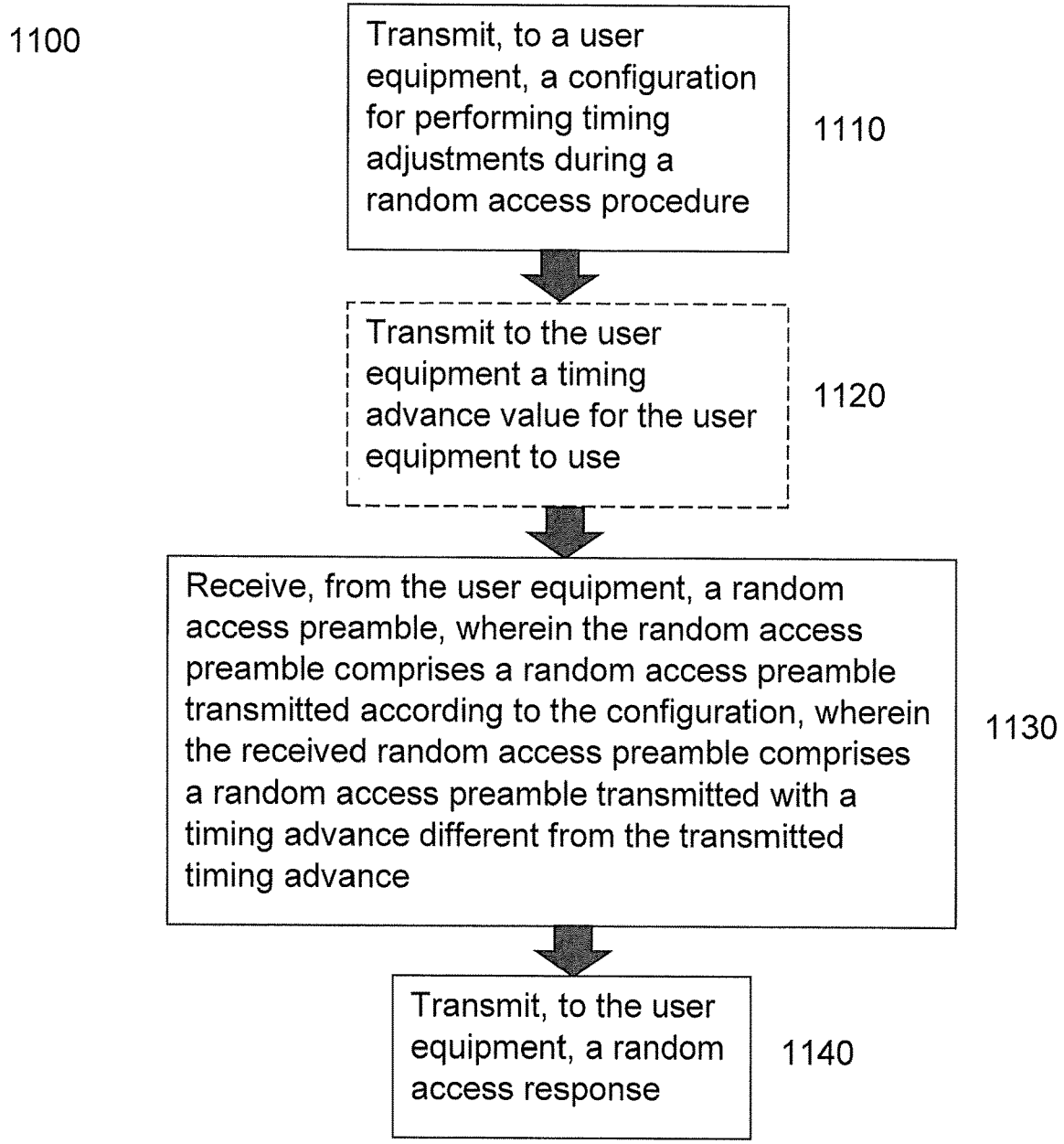
FIG. 11 is a flowchart illustrating steps as described herein.

FIG. 11 illustrates the potential steps of an example method 1100. The example method 1100 may include: transmitting, to a user equipment, a configuration for performing timing adjustments during a random access procedure, 1110; transmitting to the user equipment a timing advance value for the user equipment to use, 1120; receiving, from the user equipment, a random access preamble, wherein the random access preamble comprises a random access preamble transmitted according to the configuration, wherein the received random access preamble comprises a random access preamble transmitted with a timing advance different from the transmitted timing advance, 1130; and transmitting, to the user equipment, a random access response, 1140. It should be noted that step 1120 may be optional.

In accordance with one aspect, an example method may be provided comprising: transmitting, with a user equipment, a random access preamble with a first timing advance value; determining that a response to the random access preamble was not received within a time period; determining one or more parameters for retransmitting the random access preamble based, at least partially, on one or more criteria, wherein the one or more parameters for retransmitting the random access preamble may comprise a second timing advance value, wherein the second timing advance value may be different from the first timing advance value; and retransmitting the random access preamble based on the one or more determined parameters.

The one or more criteria may comprise at least one of: a maximum number of retransmission attempts allowed to be made with a same timing advance value, a total number of retransmission attempts allowed to be made, a number of attempts to transmit the random access preamble that have been made, a total number of retransmission attempts allowed to be made according to a first parameter of the one or more parameters, a number of attempts to transmit the random access preamble that have been made according to the first parameter, a maximum transmission power level, a timing estimate reliability threshold value, or a location estimate reliability threshold value.

The one or more parameters may further comprise a transmission power level.

One or more of the one or more criteria may be determined by the user equipment.

One or more of the one or more criteria may be network configured.

The one or more criteria may comprise a location estimate reliability threshold value, and the example method may further comprise: determining a location of the user equipment relative to a satellite in a non-terrestrial network; determining a reliability of the determined location of the user equipment; and comparing the reliability of the determined location of the user equipment with the location estimate reliability threshold value, wherein at least one of the one or more parameters may be determined based on the comparison.

The one or more criteria may comprise a timing estimate reliability threshold value, and the example method may further comprise: determining a time of the user equipment; determining a reliability of the determined time of the user equipment; and comparing the reliability of the determined time with the timing estimate reliability threshold value, wherein at least one of the one or more parameters may be determined based on the comparison.

The transmitting and retransmitting of the random access preamble may be performed in a non-terrestrial network.

In accordance with one example embodiment, an apparatus may comprise: at least one processor; and at least one memory including computer program code; the at least one memory and the computer program code configured to, with the at least one processor, cause the apparatus to: transmit a random access preamble with a first timing advance value; determine that a response to the random access preamble was not received within a time period; determine one or more parameters for retransmitting the random access preamble based, at least partially, on one or more criteria, wherein the one or more parameters for retransmitting the random access preamble may comprise a second timing advance value, wherein the second timing advance value may be different from the first timing advance value; and retransmit the random access preamble based on the one or more determined parameters.

The one or more criteria may comprise at least one of: a maximum number of retransmission attempts allowed to be made with a same timing advance value, a total number of retransmission attempts allowed to be made, a number of attempts to transmit the random access preamble that have been made, a total number of retransmission attempts allowed to be made according to a first parameter of the one or more parameters, a number of attempts to transmit the random access preamble that have been made according to the first parameter, a maximum transmission power level, a timing estimate reliability threshold value, or a location estimate reliability threshold value.

The one or more parameters may further comprise a transmission power level.

The example apparatus may be further configured to: determine one or more of the one or more criteria.

One or more of the one or more criteria may be network configured.

The one or more criteria may comprise a location estimate reliability threshold value, and the example apparatus may be further configured to: determine a location of the apparatus relative to a satellite in a non-terrestrial network; determine a reliability of the determined location of the apparatus; and compare the reliability of the determined location of the apparatus with the location estimate reliability threshold value, wherein at least one of the one or more parameters may be determined based on the comparison.

The one or more criteria may comprise a timing estimate reliability threshold value, and the example apparatus may be further configured to: determine a time of the apparatus; determine a reliability of the determined time of the apparatus; and compare the reliability of the determined time with the timing estimate reliability threshold value, wherein at least one of the one or more parameters may be determined based on the comparison.

The example apparatus may be further configured to: perform transmission and retransmission of the random access preamble in a non-terrestrial network.

In accordance with one example embodiment, an apparatus may comprise: circuitry configured to perform: transmit a random access preamble with a first timing advance value; determine that a response to the random access preamble was not received within a time period; determine one or more parameters for retransmitting the random access preamble based, at least partially, on one or more criteria, wherein the one or more parameters for retransmitting the random access preamble may comprise a second timing advance value, wherein the second timing advance value may be different from the first timing advance value; and retransmit the random access preamble based on the one or more determined parameters.

In accordance with one example embodiment, an apparatus may comprise: processing circuitry; memory circuitry including computer program code, the memory circuitry and the computer program code configured to, with the processing circuitry, enable the apparatus to: transmit a random access preamble with a first timing advance value; determine that a response to the random access preamble was not received within a time period; determine one or more parameters for retransmitting the random access preamble based, at least partially, on one or more criteria, wherein the one or more parameters for retransmitting the random access preamble may comprise a second timing advance value, wherein the second timing advance value may be different from the first timing advance value; and retransmit the random access preamble based on the one or more determined parameters.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: transmitting a random access preamble with a first timing advance value; determining that a response to the random access preamble was not received within a time period; determining one or more parameters for retransmitting the random access preamble based, at least partially, on one or more criteria, wherein the one or more parameters for retransmitting the random access preamble comprises a second timing advance value, wherein the second timing advance value may be different from the first timing advance value; and retransmitting the random access preamble based on the one or more determined parameters.

The one or more criteria may comprise at least one of: a maximum number of retransmission attempts allowed to be made with a same timing advance value, a total number of retransmission attempts allowed to be made, a number of attempts to transmit the random access preamble that have been made, a total number of retransmission attempts allowed to be made according to a first parameter of the one or more parameters, a number of attempts to transmit the random access preamble that have been made according to the first parameter, a maximum transmission power level, a timing estimate reliability threshold value, or a location estimate reliability threshold value.

The one or more parameters may further comprise a transmission power level.

The means may be further configured to perform determining of one or more of the one or more criteria.

One or more of the one or more criteria may be network configured.

The one or more criteria may comprise a location estimate reliability threshold value, wherein the means may be further configured to perform: determining a location of the apparatus relative to a satellite in a non-terrestrial network; determining a reliability of the determined location of the apparatus; and comparing the reliability of the determined location of the apparatus with the location estimate reliability threshold value, wherein at least one of the one or more parameters may be determined based on the comparison.

The one or more criteria may comprise a timing estimate reliability threshold value, wherein the means may be further configured to perform: determining a time of the apparatus; determining a reliability of the determined time of the apparatus; and comparing the reliability of the determined time with the timing estimate reliability threshold value, wherein at least one of the one or more parameters may be determined based on the comparison.

The transmitting and retransmitting of the random access preamble may be performed in a non-terrestrial network.

In accordance with one example embodiment, a non-transitory computer-readable medium comprising program instructions stored thereon which, when executed with at least one processor, cause the at least one processor to: transmit a random access preamble with a first timing advance value; determine that a response to the random access preamble was not received within a time period; determine one or more parameters for retransmitting the random access preamble based, at least partially, on one or more criteria, wherein the one or more parameters for retransmitting the random access preamble may comprise a second timing advance value, wherein the second timing advance value may be different from the first timing advance value; and retransmit the random access preamble based on the one or more determined parameters.

The one or more criteria may comprise at least one of: a maximum number of retransmission attempts allowed to be made with a same timing advance value, a total number of retransmission attempts allowed to be made, a number of attempts to transmit the random access preamble that have been made, a total number of retransmission attempts allowed to be made according to a first parameter of the one or more parameters, a number of attempts to transmit the random access preamble that have been made according to the first parameter, a maximum transmission power level, a timing estimate reliability threshold value, or a location estimate reliability threshold value.

The one or more parameters may further comprise a transmission power level.

The example non-transitory computer-readable medium may be further configured to: determine one or more of the one or more criteria.

One or more of the one or more criteria may be network configured.

The one or more criteria may comprise a location estimate reliability threshold value, and the example non-transitory computer-readable medium may be further configured to: determine a location of a user equipment relative to a satellite in a non-terrestrial network; determine a reliability of the determined location of the user equipment; and compare the reliability of the determined location of the apparatus with the location estimate reliability threshold value, wherein at least one of the one or more parameters may be determined based on the comparison.

The one or more criteria may comprise a timing estimate reliability threshold value, and the example non-transitory computer-readable medium may be further configured to: determine a time of a user equipment; determine a reliability of the determined time of the user equipment; and compare the reliability of the determined time with the timing estimate reliability threshold value, wherein at least one of the one or more parameters may be determined based on the comparison.

The example non-transitory computer-readable medium may be further configured to: perform transmission and retransmission of the random access preamble in a non-terrestrial network.

In accordance with another example embodiment, a non-transitory program storage device readable by a machine may be provided, tangibly embodying a program of instructions executable by the machine for performing operations, the operations comprising: transmit a random access preamble with a first timing advance value; determine that a response to the random access preamble was not received within a time period; determine one or more parameters for retransmitting the random access preamble based, at least partially, on one or more criteria, wherein the one or more parameters for retransmitting the random access preamble may comprise a second timing advance value, wherein the second timing advance value may be different from the first timing advance value; and retransmit the random access preamble based on the one or more determined parameters.

In accordance with one aspect, an example method may be provided comprising: transmitting, to a user equipment, a configuration for performing timing adjustments during a random access procedure; transmitting to the user equipment a timing advance value for the user equipment to use; receiving, from the user equipment, a random access preamble, wherein the random access preamble may comprise a random access preamble transmitted according to the configuration, wherein the received random access preamble may comprise a random access preamble transmitted with a timing advance different from the transmitted timing advance; and transmitting, to the user equipment, a random access response.

The example method may further comprise: transmitting to the user equipment at least one of: a transmission power level for the user equipment to use, a configuration for a power ramping procedure, or reference time information.

In accordance with one example embodiment, an apparatus may comprise: at least one processor; and at least one memory including computer program code; the at least one memory and the computer program code configured to, with the at least one processor, cause the apparatus to: transmit, to a user equipment, a configuration for performing timing adjustments during a random access procedure; transmit to the user equipment a timing advance value for the user equipment to use; receive, from the user equipment, a random access preamble, wherein the random access preamble may comprise a random access preamble transmitted according to the configuration, wherein the received random access preamble may comprise a random access preamble transmitted with a timing advance different from the transmitted timing advance; and transmit, to the user equipment, a random access response.

The example apparatus may be further configured to: transmit to the user equipment at least one of: a transmission power level for the user equipment to use, a configuration for a power ramping procedure, or reference time information.

In accordance with one example embodiment, an apparatus may comprise: circuitry configured to perform: transmit, to a user equipment, a configuration for performing timing adjustments during a random access procedure; transmit to the user equipment a timing advance value for the user equipment to use; receive, from the user equipment, a random access preamble, wherein the random access preamble may comprise a random access preamble transmitted according to the configuration, wherein the received random access preamble may comprise a random access preamble transmitted with a timing advance different from the transmitted timing advance; and transmit, to the user equipment, a random access response.

In accordance with one example embodiment, an apparatus may comprise: processing circuitry; memory circuitry including computer program code, the memory circuitry and the computer program code configured to, with the processing circuitry, enable the apparatus to: transmit, to a user equipment, a configuration for performing timing adjustments during a random access procedure; transmit to the user equipment a timing advance value for the user equipment to use; receive, from the user equipment, a random access preamble, wherein the random access preamble may comprise a random access preamble transmitted according to the configuration, wherein the received random access preamble may comprise a random access preamble transmitted with a timing advance different from the transmitted timing advance; and transmit, to the user equipment, a random access response.

In accordance with one example embodiment, an apparatus may comprise means for performing: transmitting, to a user equipment, a configuration for performing timing adjustments during a random access procedure; transmitting to the user equipment a timing advance value for the user equipment to use; receiving, from the user equipment, a random access preamble, wherein the random access preamble may comprise a random access preamble transmitted according to the configuration, wherein the received random access preamble may comprise a random access preamble transmitted with a timing advance different from the transmitted timing advance; and transmitting, to the user equipment, a random access response.

The means may be further configured to perform: transmitting to the user equipment at least one of: a transmission power level for the user equipment to use, a configuration for a power ramping procedure, or reference time information.

In accordance with one example embodiment, a non-transitory computer-readable medium comprising program instructions stored thereon which, when executed with at least one processor, cause the at least one processor to: transmit, to a user equipment, a configuration for performing timing adjustments during a random access procedure; transmit to the user equipment a timing advance value for the user equipment to use; receive, from the user equipment, a random access preamble, wherein the random access preamble may comprise a random access preamble transmitted according to the configuration, wherein the received random access preamble may comprise a random access preamble transmitted with a timing advance different from the transmitted timing advance; and transmit, to the user equipment, a random access response.

The example non-transitory computer-readable medium may be further configured to: transmit to the user equipment at least one of: a transmission power level for the user equipment to use, a configuration for a power ramping procedure, or reference time information.

In accordance with another example embodiment, a non-transitory program storage device readable by a machine may be provided, tangibly embodying a program of instructions executable by the machine for performing operations, the operations comprising: transmit, to a user equipment, a configuration for performing timing adjustments during a random access procedure; transmit to the user equipment a timing advance value for the user equipment to use; receive, from the user equipment, a random access preamble, wherein the random access preamble may comprise a random access preamble transmitted according to the configuration, wherein the received random access preamble may comprise a random access preamble transmitted with a timing advance different from the transmitted timing advance; and transmit, to the user equipment, a random access response.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. A method comprising:
   transmitting, with a user equipment, a random access preamble with a first timing advance value;
   determining that a response to the random access preamble was not received within a time period;
   determining one or more parameters for retransmitting the random access preamble based, at least partially, on one or more criteria, wherein the one or more parameters for retransmitting the random access preamble comprises a second timing advance value, wherein the second timing advance value is different from the first timing advance value; and
   retransmitting the random access preamble based on the one or more determined parameters.

2. The method of claim 1, wherein the one or more criteria comprise at least one of:
   a maximum number of retransmission attempts allowed to be made with a same timing advance value,
   a total number of retransmission attempts allowed to be made,
   a number of attempts to transmit the random access preamble that have been made,
   a total number of retransmission attempts allowed to be made according to a first parameter of the one or more parameters,
   a number of attempts to transmit the random access preamble that have been made according to the first parameter,
   a maximum transmission power level,
   a timing estimate reliability threshold value, or
   a location estimate reliability threshold value.

3. The method of claim 1, wherein the one or more parameters further comprises a transmission power level.

4. The method of claim 1, wherein one or more of the one or more criteria are determined with the user equipment.

5. The method of claim 1, wherein one or more of the one or more criteria are network configured.

6. The method of claim 1, wherein the one or more criteria comprises a location estimate reliability threshold value, further comprising:
   determining a location of the user equipment relative to a satellite in a non-terrestrial network;
   determining a reliability of the determined location of the user equipment; and
   comparing the reliability of the determined location of the user equipment with the location estimate reliability threshold value, wherein at least one of the one or more parameters is determined based on the comparison.

7. The method of claim 1, wherein the one or more criteria comprises a timing estimate reliability threshold value, further comprising:
   determining a time of the user equipment;
   determining a reliability of the determined time of the user equipment; and
   comparing the reliability of the determined time with the timing estimate reliability threshold value, wherein at least one of the one or more parameters is determined based on the comparison.

8. The method of claim 1, wherein the transmitting and retransmitting of the random access preamble are performed in a non-terrestrial network.

9. A non-transitory program storage device readable with an apparatus, tangibly embodying a program of instructions executable with the apparatus for performing the method of claim 1.

10. An apparatus comprising:
    at least one processor; and
    at least one non-transitory memory storing instructions that, when executed with the at least one processor, cause the apparatus to:
      transmit a random access preamble with a first timing advance value;
      determine that a response to the random access preamble was not received within a time period;
      determine one or more parameters for retransmitting the random access preamble based, at least partially, on one or more criteria, wherein the one or more parameters for retransmitting the random access preamble comprises a second timing advance value, wherein the second timing advance value is different from the first timing advance value; and
      retransmit the random access preamble based on the one or more determined parameters.

11. The apparatus of claim 10, wherein the one or more criteria comprise at least one of:
    a maximum number of retransmission attempts allowed to be made with a same timing advance value,
    a total number of retransmission attempts allowed to be made,
    a number of attempts to transmit the random access preamble that have been made,
    a total number of retransmission attempts allowed to be made according to a first parameter of the one or more parameters,
    a number of attempts to transmit the random access preamble that have been made according to the first parameter,
    a maximum transmission power level,
    a timing estimate reliability threshold value, or
    a location estimate reliability threshold value.

12. The apparatus of claim 10, wherein the one or more parameters further comprises a transmission power level.

13. The apparatus of claim 10, wherein the instructions, when executed with the at least one processor, cause the apparatus to determine one or more of the one or more criteria.

14. The apparatus of claim 10, wherein one or more of the one or more criteria are network configured.

15. The apparatus of claim 10, wherein the one or more criteria comprises a location estimate reliability threshold value, wherein the instructions, when executed with the at least one processor, cause the apparatus to:
    determine a location of the apparatus relative to a satellite in a non-terrestrial network;
    determine a reliability of the determined location of the apparatus; and
    compare the reliability of the determined location of the apparatus with the location estimate reliability threshold value, wherein at least one of the one or more parameters is determined based on the comparison.

16. The apparatus of claim 10, wherein
    the one or more criteria comprises a timing estimate reliability threshold value, wherein the instructions, when executed with the at least one processor, cause the apparatus to:
    determine a time of the apparatus;
    determine a reliability of the determined time of the apparatus; and
    compare the reliability of the determined time with the timing estimate reliability threshold value, wherein at least one of the one or more parameters is determined based on the comparison.

17. The apparatus of claim 10, wherein the instructions, when executed with the at least one processor, cause the apparatus to perform transmission and retransmission of the random access preamble in a non-terrestrial network.

18. An apparatus comprising:
    at least one processor; and
    at least one non-transitory memory storing instructions that, when executed with the at least one processor, cause the apparatus to:
      transmit, to a user equipment, a configuration for performing timing adjustments during a random access procedure;
      transmit to the user equipment a timing advance value for the user equipment to use;
      receive, from the user equipment, a random access preamble, wherein the random access preamble comprises a random access preamble transmitted according to the configuration, wherein the received random access preamble comprises a random access preamble transmitted with a timing advance different from the transmitted timing advance; and
      transmit, to the user equipment, a random access response.

19. The apparatus of claim 18, wherein the instructions, when executed with the at least one processor, cause the apparatus to transmit to the user equipment at least one of:
    a transmission power level for the user equipment to use,
    a configuration for a power ramping procedure, or
    reference time information.

* * * * *